(12) United States Patent
Zhang et al.

(10) Patent No.: US 11,712,675 B2
(45) Date of Patent: Aug. 1, 2023

(54) MOLECULAR SIEVE-BASED CATALYST MODIFICATION APPARATUS, AND METHOD

(71) Applicant: Dalian Institute of Chemical Physics, Chinese Academy of Sciences, Dalian (CN)

(72) Inventors: Tao Zhang, Dalian (CN); Mao Ye, Dalian (CN); Zhongmin Liu, Dalian (CN); Jinling Zhang, Dalian (CN); Hailong Tang, Dalian (CN); Jinming Jia, Dalian (CN); Xiangao Wang, Dalian (CN); Cheng Zhang, Dalian (CN); Hua Li, Dalian (CN); Yinfeng Zhao, Dalian (CN); Chenggong Li, Dalian (CN)

(73) Assignee: Dalian Institute of Chemical Physics, Chinese Academy of Sciences, Dalian (CN)

( * ) Notice: Subject to any disclaimer, the term of this patent is extended or adjusted under 35 U.S.C. 154(b) by 419 days.

(21) Appl. No.: 16/767,238

(22) PCT Filed: Nov. 30, 2017

(86) PCT No.: PCT/CN2017/113984
§ 371 (c)(1),
(2) Date: May 27, 2020

(87) PCT Pub. No.: WO2019/104655
PCT Pub. Date: Jun. 6, 2019

(65) Prior Publication Data
US 2020/0406214 A1    Dec. 31, 2020

(51) Int. Cl.
*B01J 8/00* (2006.01)
*B01J 8/18* (2006.01)
(Continued)

(52) U.S. Cl.
CPC ............ *B01J 8/1827* (2013.01); *B01D 45/16* (2013.01); *B01D 50/20* (2022.01); *B01J 8/002* (2013.01);
(Continued)

(58) Field of Classification Search
CPC ........ B01J 8/1827; B01J 8/002; B01J 8/0055; B01J 8/006; B01J 8/1836; B01J 29/40;
(Continued)

(56) References Cited

U.S. PATENT DOCUMENTS 3,911,041 A    10/1975    Kaeding et al.
6,083,865 A     7/2000    Drake et al.

FOREIGN PATENT DOCUMENTS

CN       1880288 A      12/2006
CN     101602013 A      12/2009
(Continued)

OTHER PUBLICATIONS

Borello, Ettore, "Extended EP-Search Report (EESR): EPO Application No. EP 17933606", dated Apr. 11, 2020.

*Primary Examiner* — Huy Tram Nguyen
(74) *Attorney, Agent, or Firm* — Edwin A. Sisson, Attorney at Law, LLC; Jeffrey J. Banyas

(57) ABSTRACT

The present application discloses a molecular sieve-based catalyst modification apparatus. The apparatus comprises a feed unit 1, a modification unit 2 and a cooling unit 3 connected in sequence; the feed unit comprises a catalyst feed unit 11 and a modifier feed unit 12, a catalyst and a modifier are introduced into the modification unit 2 respectively by the catalyst feed unit and the modifier feed unit and are discharged from the modification unit after sufficient reaction in modification unit, and then enter the cooling unit 3 for cooling. The present application further discloses a use method for the molecular sieve-based catalyst modification
(Continued)

apparatus. The use method comprises: introducing a catalyst and a modifier into the modification unit 2 respectively through the feed unit 1; wherein the catalyst is modified by the modifier in the modification unit 2, and then discharged to the cooling unit 3 to cool until the temperature is lower than 50° C., and then the cooled modified catalyst is transferred to any storage device.

11 Claims, 1 Drawing Sheet

(51) Int. Cl.
*B01D 45/16* (2006.01)
*B01J 29/40* (2006.01)
*B01J 29/85* (2006.01)
*B01J 37/28* (2006.01)
*B01D 50/20* (2022.01)

(52) U.S. Cl.
CPC ............. *B01J 8/006* (2013.01); *B01J 8/0055* (2013.01); *B01J 8/1836* (2013.01); *B01J 29/40* (2013.01); *B01J 29/85* (2013.01); *B01J 37/28* (2013.01); *B01J 2208/00389* (2013.01); *B01J 2208/00504* (2013.01); *B01J 2208/00752* (2013.01); *B01J 2208/00893* (2013.01)

(58) Field of Classification Search
CPC .. B01J 29/85; B01J 37/28; B01J 2208/00389; B01J 2208/00504; B01J 2208/00752; B01J 2208/00893; B01J 29/06; B01J 2208/00176; B01J 2208/00398; B01J 2208/0053; B01J 2208/00761; B01J 2229/10; B01J 2229/18; B01J 2229/32; B01J 2229/34; B01J 8/087; B01J 8/003; B01J 8/00; B01J 8/085; B01J 8/125; B01J 31/00; B01J 37/0009; B01J 37/08; B01J 2208/00654; B01J 29/00; B01D 45/16; B01D 50/20
USPC ......................................................... 502/77
See application file for complete search history.

(56) References Cited

FOREIGN PATENT DOCUMENTS

| | | |
|---|---|---|
| CN | 101550051 B | 11/2012 |
| CN | 105312080 A | 2/2016 |
| CN | 105524300 A | 4/2016 |
| CN | 106238094 A | 12/2016 |
| CN | 106829994 A | 6/2017 |
| EA | 200500425 A1 | 12/2005 |
| KR | 20160095024 A | 8/2016 |
| RU | 2233845 C2 | 8/2004 |
| RU | 2644173 C2 | 2/2018 |

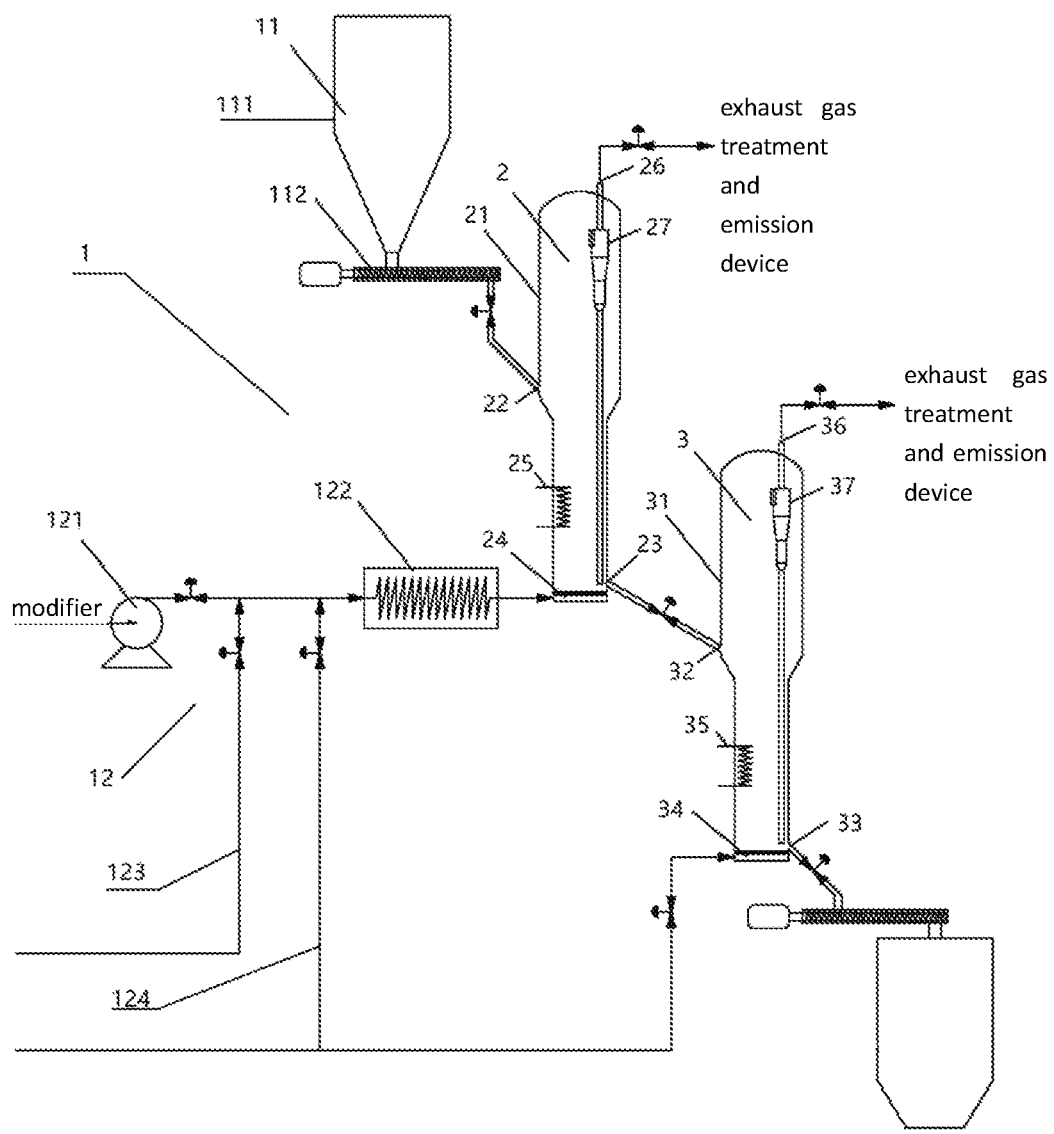

MOLECULAR SIEVE-BASED CATALYST MODIFICATION APPARATUS, AND METHOD

PRIORITIES AND CROSS REFERENCES

This Application claims priority from International Application No. PCT/CN2017/113984 filed on 30 Nov. 2017, the teachings of which are incorporated by reference herein in their entirety.

TECHNICAL FIELD

The present application relates to a molecular sieve-based catalyst modification apparatus and a method for using the same, which belongs to the field of chemical engineering.

BACKGROUND

Ethylene and propylene are the cornerstones of the huge petrochemical industry, and most organic chemicals are derived from ethylene and propylene. P-xylene (PX) is a raw material for producing polyesters such as PET (polyethylene terephthalate), PBT (polybutylene terephthalate) and PTT (polytrimethylene terephthalate). In recent years, the large number of applications of polyester in textile and garment, beverage packaging and other fields has driven the rapid growth of PTA (pure terephthalic acid) and upstream product PX in production and consumption. At present, the source of PX is mainly prepared by disproportionation, isomerization and adsorption separation or cryogenic separation using toluene, C9 aromatic hydrocarbon and mixed xylene obtained by naphtha reforming. The equipment investment is large and the operation cost is high. Since the content of p-xylene in the product is thermodynamically controlled, p-xylene only accounts for about 20% of the xylene isomer, and the difference in boiling points of the three xylene isomers are small, so high purity P-xylene cannot be obtained by ordinary distillation techniques and an expensive adsorption separation process must be used.

U.S. patents such as U.S. Pat. Nos. 3,911,041, 4,049,573, 4,100,219 and other patents disclose a methanol to olefin reaction with a HZSM-5 catalyst modified by phosphorus, magnesium, silicon and so on; U.S. patents of U.S. Pat. Nos. 5,367,100 and 5,573,990 disclose the use of HZSM-5 molecular sieve-based catalyst modified by phosphorus and lanthanum for preparing a low carbon olefin from methanol or dimethyl ether by Dalian institute of chemical physics, Chinese academy of sciences. Since the 1970s, the research on the technology of alkylation of toluene and methanol to prepare p-xylene has been carried out at home and abroad. Toluene and methanol are used as raw materials in this method, and the selectivity to PX in the reaction product is high, the use of expensive adsorption separation technology can be avoid in the production process and high-purity p-xylene can be obtained by simple crystallization separation, and the content of benzene in the product is low. U.S. Pat. No. 4,250,345 discloses the use of a phosphorus and magnesium modified ZSM-5 molecular sieve-based catalyst with an optimum selectivity to p-xylene in its isomer of about 98% at 450° C. The above reports indicate that a methanol to low-carbon olefin reaction and an alkylation reaction of methanol and toluene for preparing p-xylene can be carried out with HZSM-5 molecular sieve-based catalyst. However, the two reaction processes are different, there are also large differences in the physicochemical properties of the catalyst. Therefore, if a catalyst which can simultaneously satisfy the requirements of a methanol to olefin reaction and an alkylation reaction of methanol and toluene for preparing p-xylene can be prepared by a suitable modification method, the same catalyst can be used to simultaneously produce olefin (ethylene, propylene and butylene) and p-xylene. The HZ SM-5 molecular sieve-based catalyst modified by alkaline earth metal, non-metal, rare earth metal and siloxane-based compound has low toluene conversion rate. In addition, the preparation process of the catalyst is complicated, and multiple modification and baking processes are required. Therefore, the development of a new catalyst preparation method and preparation apparatus for preparing p-xylene and olefin from methanol, benzene and/or toluene has very important significance and significant practical applicability.

SUMMARY OF THE INVENTION

According to an aspect of the present application, a molecular sieve-based catalyst modification apparatus capable of modifying a molecular sieve based catalyst to obtain a modified catalyst is provided, the modified catalyst is capable of catalyzing two reactions comprising a methanol to olefin reaction and an alkylation reaction of methanol and toluene for preparing p-xylene, the apparatus includes a feed unit 1, a modification unit 2, and a cooling unit 3 that are sequentially connected;

Wherein the feed unit comprises a catalyst feed unit 11 and a modifier feed unit 12, a catalyst and a modifier are introduced into the modified unit 2 by the catalyst feed unit and the modifier feed unit respectively and are discharged from the modification unit after sufficient reaction in modification unit, and enter the cooling unit 3 for cooling.

Preferably, the catalyst feed unit 11 comprises a feed bin 111, a conveyor 112, and the conveyor 112 is connected to the modification unit inlet 22 of the modification unit 2;

Preferably, the conveyor 112 is a screw conveyor;

The modifier feed unit 12 includes a modifier metering pump 121 and a preheater 122, and an outlet of the preheater 122 is connected to the modification unit feed distributor 24 of the modification unit 2;

Preferably, an inert gas pipe 123 and an air pipe 124 are disposed between the modifier metering pump 121 and the preheater 122.

Preferably, the modification unit 2 comprises a modification unit reactor 21, a modification unit inlet 22, a modification unit outlet 23, a modification unit feed distributor 24, a heater 25 and an exhaust port 26;

Wherein the modification unit reactor 21 is a fluidized bed reactor, the modification unit inlet 22 is disposed at a middle portion of the modification unit reactor 21; and the modification unit outlet 23 is disposed at the bottom of the side wall of the modification unit reactor 21; the modification unit feed distributor 24 is disposed at the bottom of the modification unit reactor 21; the heater 25 is disposed inside the modification unit reactor 21, and located below the modification unit inlet 22; the exhaust port 26 is disposed at the top of the modification unit reactor 21, preferably, the exhaust port 26 is connected to the exhaust gas treatment device;

Preferably, a modification unit gas-solid separation device 27 is disposed below the exhaust port 26 inside the reactor 21.

Preferably, the cooling unit 3 includes a cooling unit reactor 31, a cooling unit inlet 32, a cooling unit outlet 33, a cooling unit feed distributor 34, a heat extractor 35, and a cooling unit exhaust port 36;

Wherein the cooling unit reactor is a fluidized bed reactor, the cooling unit inlet 32 is disposed at a middle portion of the cooling unit reactor 31; and the cooling unit outlet 33 is disposed at the bottom of the side wall of the cooling unit reactor 31; the modification unit feed distributor 34 is disposed at a bottom of the cooling unit reactor 31; the heat extractor 35 is disposed inside the cooling unit reactor 31, and is located below the modification unit inlet 32; the cooling unit exhaust port 36 is disposed at the top of the cooling unit reactor 31, preferably, the exhaust port 36 is connected to the exhaust gas treatment device;

Preferably, a cooling unit gas-solid separation device 37 is disposed below the cooling unit exhaust port 36 inside the cooling unit reactor 31.

Preferably, the modification unit feed distributor 24 is any one selected from a powder metallurgy sintered plate distributor, a multi-tube distributor, and a distributor with wind caps.

Preferably, the heater 25 is at least one selected from an electric heater and a high temperature gas heater.

Preferably, the modification unit gas-solid separator 27 is at least one selected from a cyclone separator and a filter.

Preferably, the cooling unit feed distributor 34 is any one selected from a powder metallurgy sintered plate distributor, a multi-tube distributor, and a distributor with wind caps.

Preferably, the heat extractor 35 is at least one selected from a cooling water heat extractor and a cooling air heat extractor.

Preferably, the modification unit gas-solid separator 37 is at least one selected from a cyclone separator and a filter.

According to still another aspect of the present invention, a method for modifying molecular sieve-based catalyst is provided, which uses at least one of the molecular sieve-based catalyst modification apparatuses provided by the present invention;

Preferably, the method comprises introducing a catalyst and a modifier into the modification unit (2) respectively through the feed unit (1), wherein the catalyst is modified by the modifier in the modification unit (2), and then discharged to the cooling unit (3) to cool until the temperature is lower than 50° C., and then the cooled modified catalyst is transferred to any storage device.

Preferably, the introduced catalyst is subjected to an activation treatment in the modification unit (2) before the modification, and the activation treatment specifically comprises:

a) introducing air into the modification unit through the modifier feed unit;

b) heating the catalyst to an activation treatment temperature, wherein the activation treatment temperature is in a range of 400° C. to 650° C.;

c) activating the catalyst for an activation time in a range of 0.5 h to 3 h at an activation treatment temperature.

Preferably, the air in the modification unit (2) is replaced with an inert gas after finishing the activation, and the replacement time is greater than 5 min;

Preferably, when the gas phase oxygen concentration is less than 1 vol. %, the replacement is completed.

Preferably, a modifier is introduced after finishing the replacement, which is heated and vaporized before being introduced and carried into the modification unit (2) by inert gas.

Preferably, the modification is carried out under an inert gas atmosphere at a temperature in a range of 150° C. to 600° C. with a modification time in a range of 0 h to 10 h.

Preferably, the modified catalyst is first calcined after finishing the modification and then discharged to the cooling unit.

Preferably, the calcination is carried out under an air atmosphere at a calcination temperature in a range of 400° C. to 700° C. with a calcination time in a range of 1 h to 6 h.

Preferably, the molecular sieve-based catalyst is any one selected from HZSM-5 and HZSM-11 molecular sieve-based catalysts.

Preferably, the modifier is at least one selected from a phosphorus reagent, a silylating reagent, and toluene.

Preferably, the phosphorus reagent is at least one selected from the compounds with the formula I:

formula I wherein
$R_1$, $R_2$, $R_3$ is independently selected from $C_1$~$C_{10}$ alkyl or $C_1$-$C_{10}$ alkoxy.

Preferably, at least one of $R_1$, $R_2$, $R_3$ in formula I is selected from $C_1$-$C_{10}$ alkoxy;

Preferably, the phosphorus reagent is at least one selected from trimethoxyphosphine, triethoxyphosphine, tripropoxyphosphine, tributoxyphosphine, and methyldiethoxyphosphine.

Preferably, the silylating reagent is at least one selected from the compounds with the formula II:

formula II

Wherein $R_4$, $R_5$, $R_6$, $R_7$ are independently selected from $C_1$~$C_{10}$ alkyl or $C_1$-$C_{10}$ alkoxy.

Preferably, at least one of $R_4$, $R_5$, $R_6$, $R_7$ in formula II is selected from $C_1$-$C_{10}$ alkoxy.

Preferably, the silylating reagent is at least one selected from tetramethyl silicate, tetraethyl silicate, tetrapropyl silicate, and tetrabutyl silicate.

Preferably, the modifier has a phosphorus reagent content in a range of 1% to 10% by weight based on the total mass of the mixture.

Preferably, the modifier has a silylating reagent content in a range of 1% to 40% by weight based on the total mass of the mixture.

The beneficial effects that can be produced by this application include:

1) The structure and connection mode of the apparatus in the present invention are relatively simple and convenient to use;

2) In a preferred example of the present invention, the modification reactor is a fluidized bed reactor, and thus the catalyst is in a state of complete mixing flow, and the prepared catalyst has uniform performance and high activity;

3) The apparatus and the method of using the same provided by the present application can be used for industrial scale and continuous modification of catalyst for preparing p-xylene and olefin from methanol, benzene and/or toluene;

4) The catalyst modified by the apparatus and the method of the present application has a high raw material conversion rate and a high selectivity to p-xylene with a conversion rate of benzene and/or toluene more than 30 wt. %, a conversion rate of methanol greater than 80 wt. %, a total selectivity to (ethylene+propylene+butene+P-xylene) greater than 75 wt. %, and the selectivity to P-xylene in the xylene isomer is greater than 90 wt. %.

DESCRIPTION OF THE FIGURES

FIG. 1 is a schematic view showing the structure of the molecular sieve-based catalyst modification apparatus of the present application.

LIST OF PARTS AND REFERENCE NUMBERS

1—feed unit;
2—modification unit;
3—cooling unit;
11—catalyst feed unit;
12—modifier feed unit;
111—feed bin;
112—conveyor;
121—metering pump
122—preheater
123—inert gas pipe
124—air pipe
21—modification unit reactor
22—modification unit inlet
23—modification unit outlet
24—modification unit feed distributor
25—heater
26—modification unit exhaust port
27—modification unit gas-solid separation device
31—cooling unit reactor
32—cooling unit inlet
33—cooling unit outlet
34—cooling unit feed distributor
35—heat extractor
36—cooling unit exhaust
37—cooling unit gas-solid separation device

DETAILED DESCRIPTION OF THE EMBODIMENT

The present application is described in detail below with reference to the examples, but the application is not limited to the examples.

Unless otherwise stated, the materials and catalysts in the examples of the present application are commercially purchased, wherein:

HZSM-5 molecular sieve-based catalyst and HZSM-11 molecular sieve-based catalyst are purchased from Nankai University Catalyst Factory, and the product particle size distribution is in a range of 20-150 μm, $D_{50}$=100 μm.

Toluene is purchased from Qilu branch of sinopec, a superior grade product.

Trimethoxy phosphine, triethoxy phosphine, tripropoxy phosphine, tributoxy phosphine and methyl diethoxy phosphine are purchased from Wuhan Zeshancheng Biomedical Technology Co., Ltd., purity: 99%.

Tetramethyl silicate, tetraethyl silicate, tetrapropyl silicate and tetrabutyl silicate are purchased from Shandong Wanda Silicone New Materials Co., Ltd., purity: 99%.

Example 1

The apparatus shown in FIG. 1 is employed.

In this example, the reactor feed distributor is a powder metallurgy sintered plate distributor, the reactor heater is an electric heater, and the reactor gas-solid separator is a cyclone separator.

In this example, the cooler gas distributor is a powder metallurgy sintered plate distributor, the cooler heat extractor is a cooling water heat extractor, and the cooler gas-solid separator is a cyclone separator.

In this example, the catalyst is a HZSM-5 molecular sieve-based catalyst.

In this example, the modifier is a mixture of a phosphorus reagent, a silylating reagent, and toluene.

In this example, the phosphorus reagent is trimethoxyphosphorus; and the silylating reagent is tetramethyl silicate.

In this example, the content of phosphorus reagent in the modifier is 2% of the total mass of the mixture, and the content of silylating reagent is 20% of the total mass of the mixture.

In this example, the activation temperature is 650° C., the activation time is 3 h, the modification temperature is 600° C., the modification time is 2 h, the calcination temperature is 700° C., and the calcination time is 1 h.

The modified catalyst prepared in this example is named CAT-1.

Example 2

The apparatus shown in FIG. 1 is employed.

In this example, the reactor feed distributor is a multi-tube distributor, the reactor heater is a high temperature gas heater, and the reactor gas-solid separator is a filter.

In this example, the cooler gas distributor is a multi-tube distributor, the cooler heat extractor is a cooling air heat extractor, and the cooler gas-solid separator is a filter.

In this example, the catalyst is a HZSM-11 molecular sieve-based catalyst.

In this example, the modifier is a mixture of a phosphorus reagent, a silylating reagent, and toluene.

In this example, the phosphorus reagent is trimethoxyphosphorus; and the silylating reagent is tetraethyl silicate.

In this example, the content of phosphorus reagent in the modifier is 5% of the total mass of the mixture, and the content of silylating reagent is 40% of the total mass of the mixture.

In this example, the activation temperature is 500° C., the activation time is 3 h, the modification temperature is 500° C., the modification time is 3 h, the calcination temperature is 600° C., and the calcination time is 2 h.

The modified catalyst prepared in this example is named CAT-2.

Example 3

The apparatus shown in FIG. 1 is employed.

In this example, the reactor feed distributor is a hood type distributor, the reactor heater is a high temperature gas heater, and the reactor gas-solid separator is a filter.

In this example, the cooler gas distributor is a hood type distributor, the cooler heat extractor is a cooling water heat extractor, and the cooler gas-solid separator is a filter.

In this example, the catalyst is a HZSM-5 molecular sieve-based catalyst.

In this example, the modifier is a mixture of a phosphorus reagent, a silylating reagent, and toluene.

In this example, the phosphorus reagent is trimethoxyphosphorus; and the silylating reagent is tetramethyl silicate.

In this example, the content of phosphorus reagent in the modifier is 5% of the total mass of the mixture, and the content of silylating reagent is 40% of the total mass of the mixture.

In this example, the activation temperature is 400° C., the activation time is 3 h, the modification temperature is 400° C., the modification time is 5 h, the calcination temperature is 400° C., and the calcination time is 6 h.

The modified catalyst prepared in this example is named CAT-3.

Example 4

The apparatus shown in FIG. 1 is employed.

In this example, the reactor feed distributor is a powder metallurgy sintered plate distributor, the reactor heater is an electric heater, and the reactor gas-solid separator is a cyclone separator.

In this example, the cooler gas distributor is a powder metallurgy sintered plate distributor. The cooler heat extractor is a cooling air heat extractor, and the cooler gas-solid separator is a cyclone separator.

In this example, the catalyst is a HZSM-11 molecular sieve-based catalyst.

In this example, the modifier is a mixture of a phosphorus reagent, a silylating reagent, and toluene.

In this example, the phosphorus reagent is trimethoxyphosphorus; and the silylating reagent is tetraethyl silicate.

In this example, the content of phosphorus reagent in the modifier is 1% of the total mass of the mixture, and the content of silylation reagent is 10% of the total mass of the mixture.

In this example, the activation temperature is 500° C., the activation time is 0.5 h, the modification temperature is 300° C., the modification time is 8 h, the calcination temperature is 600° C., and the calcination time is 2 h.

The modified catalyst prepared in this example is named CAT-4.

Example 5

The reaction for preparing p-xylene and olefin from methanol with benzene and/or toluene is catalyzed using the modified catalysts prepared in Examples 1-4.

In the present application, the methanol and benzene and/or toluene, including three kinds of raw materials:

Methanol reacts with benzene, methanol reacts with toluene, and methanol reacts with benzene and toluene.

The reaction results are tested under the following conditions: the raw materials are fed with a micro feed pump, the catalyst loading is 10 g, the reaction temperature is 500° C., and the reaction pressure is normal pressure. The reaction product is analyzed by on-line Agilent 7890 gas chromatography, and sample analysis is conducted when the reaction has carried out for 10 min. The reaction conditions and results are shown in Table 1.

Methanol conversion rate=(the mass of methanol in the raw material−the mass of methanol in the reaction product)/the mass of methanol in the raw material Benzene conversion rate=(the mass of benzene in the raw material−the mass of benzene in the reaction product)/the mass of benzene in the raw material Toluene conversion rate=(the mass of toluene in the raw material−the mass of toluene in the reaction product)/the mass of toluene in the raw material Total selectivity of (ethylene+propylene+butene+p-xylene)=sum of masses of ethylene, propylene, butene and p-xylene in the reaction product/ (total mass of reaction product−the mass of methanol in reaction product−the mass of benzene in reaction product−the mass of toluene in the reaction product−the mass of water in the reaction product)

Selectivity to p-xylene in xylene isomer=the mass of p-xylene in the reaction product/the mass of xylene in the reaction product

TABLE 1

| Sequence Number | 1 | 2 | 3 | 4 | 5 | 6 | 7 | 8 |
|---|---|---|---|---|---|---|---|---|
| catalyst | CAT-1 | CAT-1 | CAT-2 | CAT-2 | CAT-3 | CAT-3 | CAT-4 | CAT-4 |
| mass space velocity of methanol (h$^{-1}$) | 1 | 1 | 2 | 2 | 1 | 1 | 1 | 1 |
| mass space velocity of benzene (h$^{-1}$) | 0 | 1 | 0 | 0.5 | 0 | 1 | 0.5 | 0 |
| mass space velocity of toluene (h$^{-1}$) | 1 | 0 | 1 | 0.5 | 1 | 0 | 0.5 | 1 |
| conversion rate of methanol (wt. %) | 91 | 92 | 80 | 81 | 95 | 96 | 98 | 97 |
| conversion rate of benzene (wt. %) | — | 30 | — | 32 | — | 35 | 33 | — |
| conversion rate of toluene (wt. %) | 35 | — | 38 | 39 | 40 | — | 40 | 39 |
| total selectivity of (ethylene + propylene + butene + p-xylene) (wt. %) | 81 | 80 | 79 | 78 | 76 | 77 | 76 | 75 |
| Selectivity to p-xylene in xylene isomer (wt. %) | 98 | 97 | 94 | 93 | 94 | 95 | 90 | 91 |

The above is only a few embodiments of the present invention, and does not. Although the present invention is disclosed in the above preferred embodiments, it is not intended to limit the present invention. Without departing from the scope of the technical solutions of the present invention, slight changes or modifications according to the technical solution disclosed above by anyone skilled in the art are equivalent to equivalent implementation cases and all fall within the scope of the technical solutions.

The invention claimed is:

1. A molecular sieve-based catalyst modification apparatus, comprising: a feed unit (1), a modification unit (2) and a cooling unit (3) connected in sequence;

wherein the feed unit comprises a catalyst feed unit (11) and a modifier feed unit (12), a catalyst and a modifier are introduced into the modification unit (2) respectively by the catalyst feed unit and the modifier feed unit and are discharged from the modification unit after sufficient reaction in modification unit, and then enter the cooling unit 3 for cooling, wherein the catalyst feed unit (11) comprises a feed bin (111), a conveyor (112), and the conveyor (112) is connected to a modification unit inlet (22) of the modification unit (2); the modifier feed unit (12) includes a modifier metering pump (121) and a preheater (122), and an outlet of the preheater (122) is connected to the modification unit feed distributor (24) of the modification unit (2).

2. The molecular sieve-based catalyst modification apparatus according to claim 1, wherein an inert gas pipe (123) and an air pipe (124) are disposed between the modifier metering pump (121) and the preheater (122).

3. The molecular sieve-based catalyst modification apparatus according to claim 1, wherein the modification unit (2) comprises a modification unit reactor (21), a modification unit inlet (22), a modification unit outlet (23), a modification unit feed distributor (24), a heater (25) and a modification unit exhaust port 26; wherein the modification unit reactor (21) is a fluidized bed reactor, the modification unit inlet (22) is disposed at a middle portion of the modification unit reactor (21); and the modification unit outlet (23) is disposed at the bottom of the side wall of the modification unit reactor (21); the modification unit feed distributor (24) is disposed at the bottom of the modification unit reactor (21); the heater (25) is disposed inside the modification unit reactor (21), and located below the modification unit inlet (22); the exhaust port (26) is disposed at the top of the modification unit reactor (21).

4. The molecular sieve-based catalyst modification apparatus according to claim 3, wherein a modification unit gas-solid separation device (27) is disposed below the exhaust port (26) inside the reactor (21).

5. The molecular sieve-based catalyst modification apparatus according to claim 1, wherein the cooling unit (3) includes a cooling unit reactor (31), a cooling unit inlet (32), a cooling unit outlet (33), a cooling unit feed distributor (34), a heat extractor (35), and a cooling unit exhaust port (36); wherein the cooling unit reactor is a fluidized bed reactor, the cooling unit inlet (32) is disposed at a middle portion of the cooling unit reactor (31); and the cooling unit outlet (33) is disposed at the bottom of the side wall of the cooling unit reactor (31); the modification unit feed distributor (34) is disposed at a bottom of the cooling unit reactor (31); the heat extractor (35) is disposed inside the cooling unit reactor (31), and is located below the modification unit inlet (32); the cooling unit exhaust port (36) is disposed at the top of the cooling unit reactor (31).

6. The molecular sieve-based catalyst modification apparatus according to claim 5, wherein a cooling unit gas-solid separation device (37) is disposed below the cooling unit exhaust port (36) inside the cooling unit reactor (31).

7. The molecular sieve-based catalyst modification apparatus according to claim 3, wherein the modification unit feed distributor (24) is any one selected from a powder metallurgy sintered plate distributor, a multi-tube distributor, and a distributor with wind caps.

8. The molecular sieve-based catalyst modification apparatus according to claim 3, wherein the heater (25) is at least one selected from an electric heater and a high temperature gas heater.

9. The molecular sieve-based catalyst modification apparatus according to claim 4, wherein the modification unit gas-solid separator (27) is at least one selected from a cyclone separator and a filter.

10. The molecular sieve-based catalyst modification apparatus according to claim 5, wherein the cooling unit feed distributor (34) is any one selected from a powder metallurgy sintered plate distributor, a multi-tube distributor, and a distributor with wind caps.

11. The molecular sieve-based catalyst modification apparatus according to claim 6, wherein the modification unit gas-solid separator (37) is at least one selected from a cyclone separator and a filter.

* * * * *